Nov. 7, 1967  M. G. BOISSEVAIN  3,351,176
INTERMITTENTLY OPERABLE CODING MECHANISM FOR CONVEYOR SYSTEM
Filed Dec. 21, 1966  4 Sheets-Sheet 1
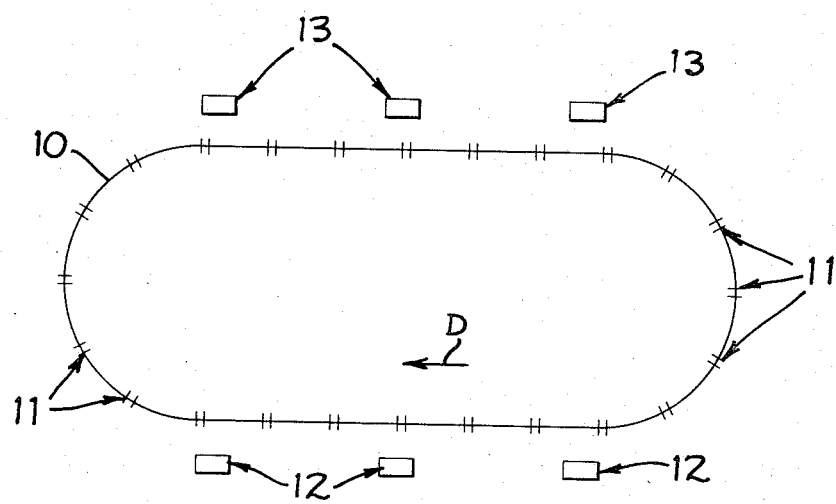
FIG_1
FIG_4
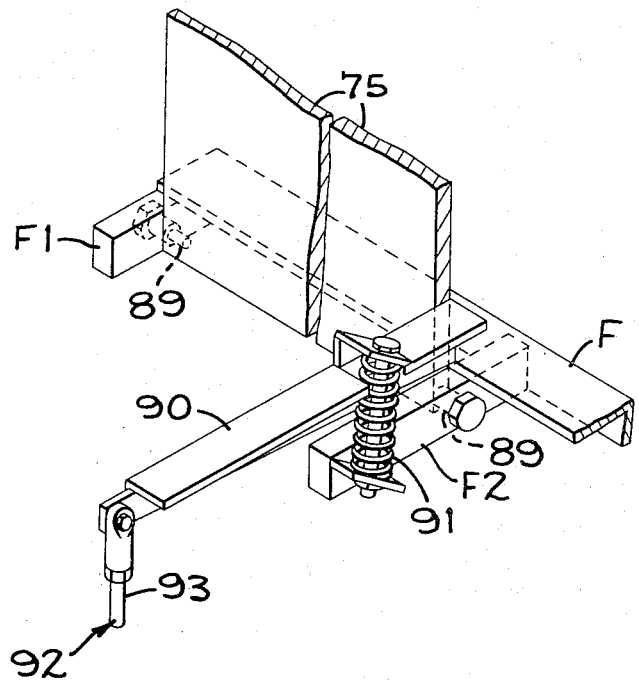
INVENTOR.
MATHEW G. BOISSEVAIN
BY
*Francis W. Anderson*
ATTORNEY

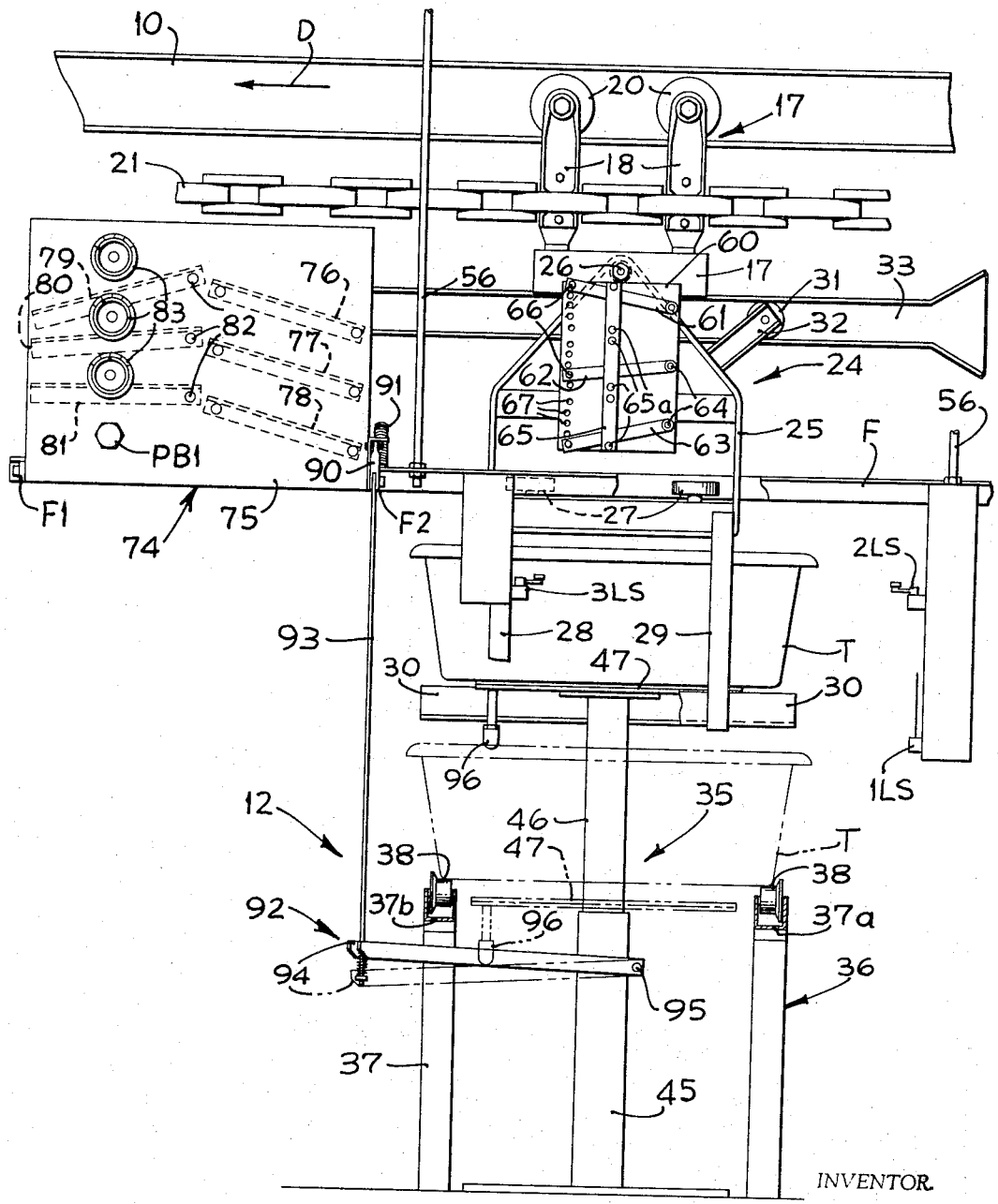

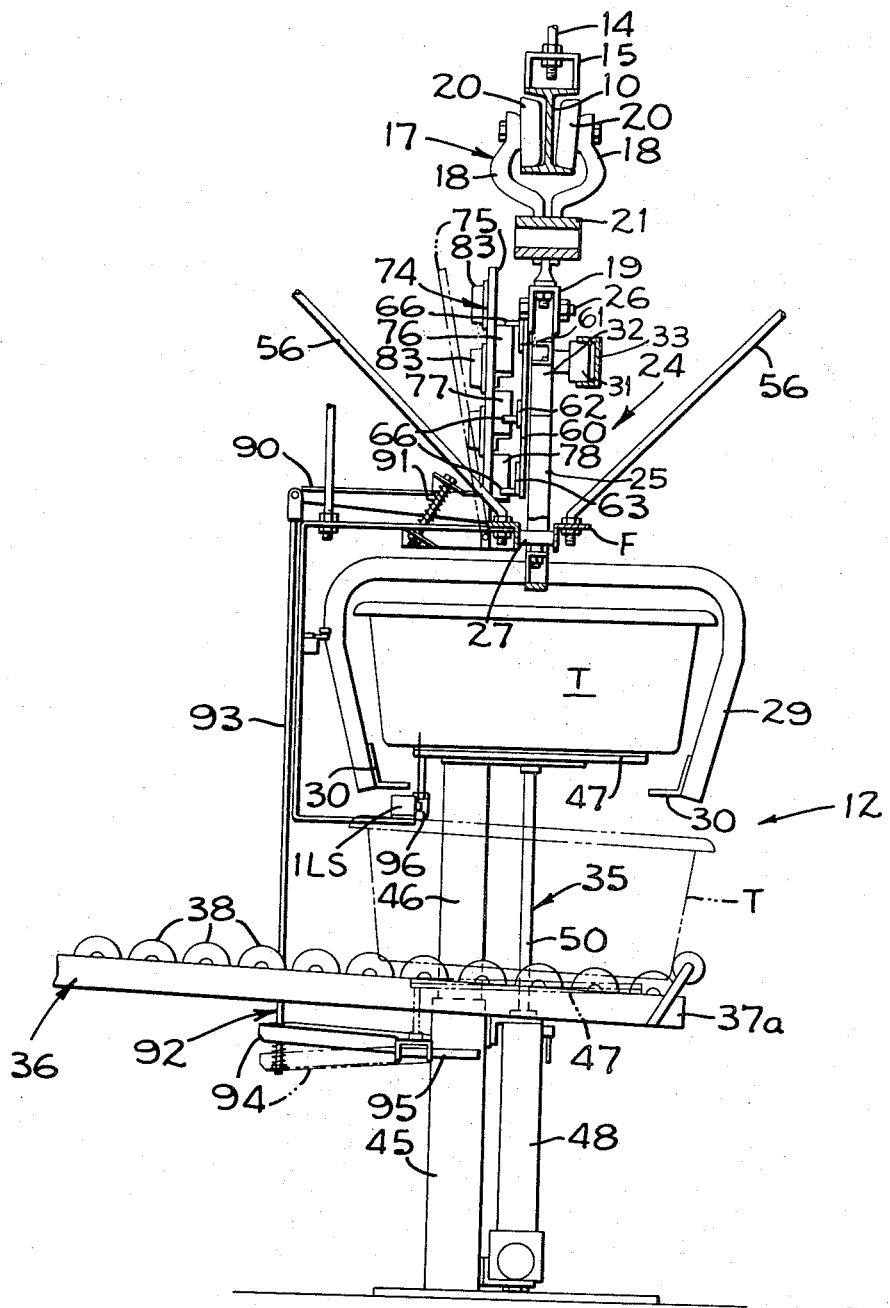

Nov. 7, 1967    M. G. BOISSEVAIN    3,351,176
INTERMITTENTLY OPERABLE CODING MECHANISM FOR CONVEYOR SYSTEM
Filed Dec. 21, 1966    4 Sheets-Sheet 4
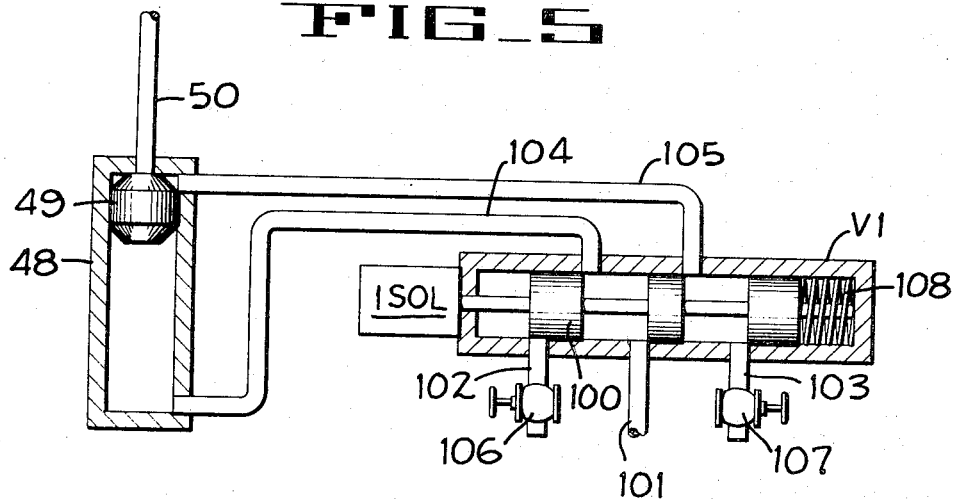
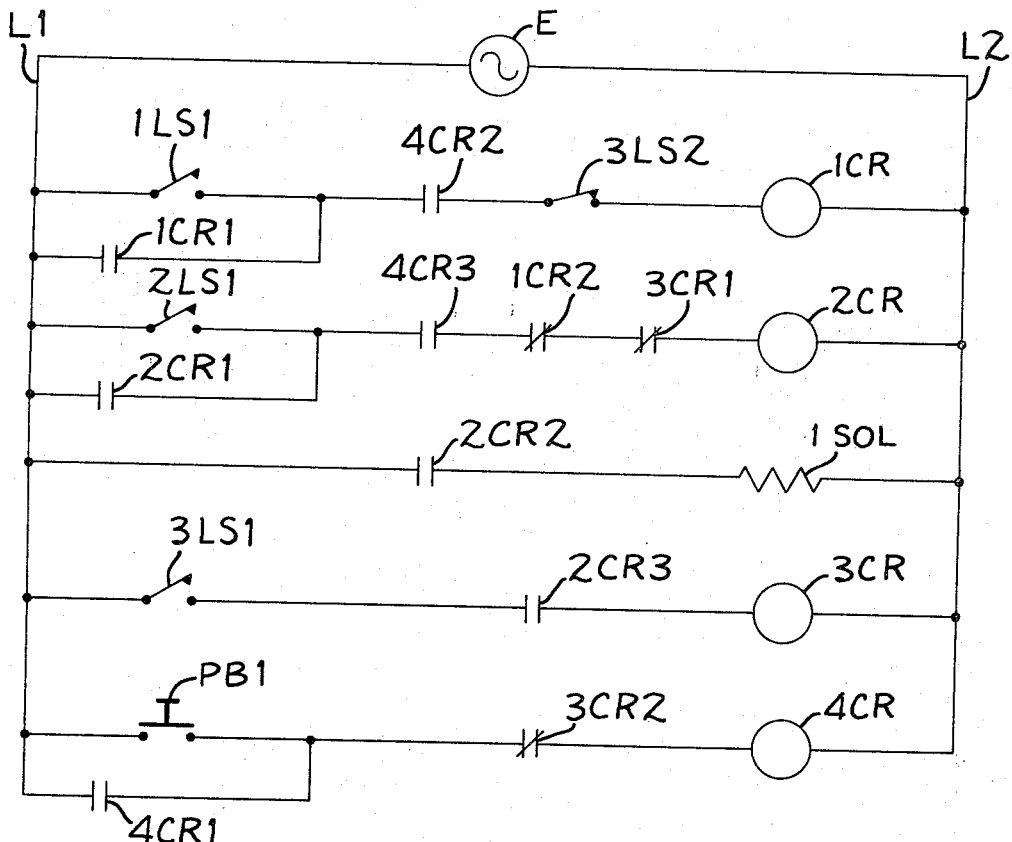
INVENTOR.
MATHEW G. BOISSEVAIN
BY
Francis W. Anderson
ATTORNEY

United States Patent Office 3,351,176
Patented Nov. 7, 1967

3,351,176
INTERMITTENTLY OPERABLE CODING MECHANISM FOR CONVEYOR SYSTEM
Mathew G. Boissevain, Los Altos, Calif., assignor to FMC Corporation, San Jose, Calif., a corporation of Delaware
Filed Dec. 21, 1966, Ser. No. 603,570
5 Claims. (Cl. 198—38)

ABSTRACT OF THE DISCLOSURE

Apparatus is shown to disable mechanism for coding carriers in a conveyor system. In the conveyor system shown, a plurality of spaced apart carriers move continuously past a loading station having a loader platform which rises selectively in response to the approach of an empty carrier to transfer a load thereto. Code mechanism at the loading station is normally urged to an effective coding position, where the code mechanism codes moving carriers just loaded at that loading station for a desired destination, but is shiftable to an ineffective, retracted position, where the code mechanism will not affect carriers coded at other loading stations. Linkage extending between the coding mechanism and the loader is actuated by the platform to shift the coding mechanism to, and hold the coding mechanism in, the retracted position when the platform is retracted.

Background of the invention

The present invention relates to coding mechanism for a conveyor system having carriers which are coded on the fly.

In one type of conveyor system, such as the type of system disclosed in the copending patent application filed Dec. 21, 1966, entitled Conveyor System of Jules R. Gallo, Mathew G. Boissevain, and W. W. Smith, Ser. No. 603,478 assigned to the same assignee to which the present invention is assigned, a plurality of spaced carriers move continuously in an endless closed loop. The carriers pass both loading stations and unloading stations as the carriers move along the closed path defined by the track on which they travel. Each loading station has a loader and on the downstream side of the loader, the station has a coding mechanism at which a carrier, loaded by the loader at that station, is coded for a desired destination. Carriers which were loaded at other stations were coded by the coding mechanism at the stations at which they were loaded. Since it is only the carriers loaded at a particular station which are coded by the code mechanism of that station, it is necessary to render the code mechanism inoperable to code passing carriers which were loaded at the other loading stations. Although the station attendant can activate the code mechanism when needed, and deactivate it when not needed, such a task is burdensome on the station attendant and it is likely that the attendant will, occasionally, forget to activate or deactivate the code mechanism.

Summary of the invention

In the present invention, the code mechanism at the loading station is rendered operable, and inoperable, in response to operation of the loader at that loading station. In brief, in the preferred form of the present invention, the code mechanism is mounted beside the track on which the carriers continuously move in spaced relation. The loader mechanism in the station has a table, or platform, over which a tote box filled with articles ready for loading is placed. When an empty carrier approaches, the platform rises, picks up the tote box and places it in the moving carrier. After the carrier has passed, the platform descends to wait until the station attendant is ready to load another tote box onto a carrier.

The coding mechanism is mounted on a vertical plate, which is tiltable between an operable position (where the code mechanism is effective to code a passing carrier) and an inoperable position (where the code mechanism is ineffective to code a passing carrier). The vertical plate, which is normally urged to an operable position, is connected by linkage to the housing from which the platform rises, and is operated by a depending plunger on the platform. The code mechanism is moved into an operable position in response to elevation of the platform (and the depending plunger thereon) and is moved into an inoperable position in response to descent of the platform (and the depending plunger thereon).

It is therefore one object of the present invention to operate the coding mechanism of a conveyor system in unison with operation of loading mechanism. It is another object of the present invention to operate the coding mechanism of a conveyor system in response to operation of the loader. It is still another object of the present invention to mechanically render the mechanism to code carriers in a loading station of a conveyor system effective when articles are loaded onto an empty carrier in that loading station to render the coding mechanism ineffective for other carriers loaded at other loading stations.

Brief description of the drawings

FIGURE 1 is a schematic plan view of a conveyor system;
FIGURE 2 is a side elevation view of a loading station of the conveyor system of FIGURE 1;
FIGURE 3 is an end view of the loading station of FIGURE 2;
FIGURE 4 is an enlarged view, in perspective, of a part of the coding mechanism at the loading station;
FIGURE 5 is a schematic pneumatic diagram of the loader of FIGURES 2 and 3; and
FIGURE 6 is a schematic electrical diagram of the loading station.

Description of the preferred embodiment

The apparatus of the present invention is disclosed in conjunction with a conveyor system having an endless track 10 and having a plurality of spaced carriers 11 continuously moving along the track in the directional sense indicated by the arrows D. A plurality of loading stations 12 and a plurality of unloading stations 13 are located adjacent the track.

As shown in FIGURE 3, the track is an I-beam supported from the ceiling by rods 14 which are connected to U-shaped brackets 15 welded to the top of the I-beam. A trolley 17 has two vertical supports 18 (FIG. 2) and a horizontal channel shaped support 19 connected to the two vertical supports. Each vertical support 18 comprises a pair of hangers (FIG. 3) which straddle the I-beam, each hanger having a roller 20 to ride on the upper surface of the lower flange of the I-beam. The drive chain 21 connects to the vertical supports 18 of the trolley and moves the trolleys continuously around the track while the conveyor system is in operation.

A carrier 24 has a frame 25 which is pivotally connected at 26 to the trolley. The carrier frame has a pair of rollers 27 mounted thereon which pass between guides defined by the stationary frame F of the station. Depending from the carrier frame 25 are two spaced arms 28 and 29, each of which envelops a tote box T received therein for carriage by the carrier. A pair of longitudinal stringers 30 are connected between the lower ends of the arms 28, 29 to define longitudinally extending inturned flanges which support a tote box received within the arms. A roller 31, connected by bar 32 to the carrier frame 25, rides in station track 33 to stabilize the carrier as it passes through the station.

The loading station 12 has a loader, indicated generally at 35, which takes tote boxes T off a conveyor 36 and transfers them onto a moving carrier. The conveyor 36 has a frame 37 including spaced rails 37a, 37b with rollers 38 thereon. The loader 35 has a housing 45 which slidably receives a shaft 46 in telescoping relationship. A platform 47 is connected to the upper end of the shaft 46. A pneumatic cylinder 48, having a slidable piston 49 (FIG. 5) therein, is connected vertically to the loader housing 45. A connecting rod 50 extends between the piston 49 and the platform 47.

The limit switches 1LS, 2LS and 3LS are mounted on the frame F which is supported from the ceiling by rods 56. The limit switches 1LS, 2LS and 3LS are passed in that order by a carrier arriving at the loading station, and limit switch 3LS is passed before the next carrier reaches limit switch 1LS. The limit switch 1LS is hit and operated only by a tote box in the carrier, and the limit switches 2LS and 3LS are hit and operated by the carrier.

A code plate 60, which is mounted on the carrier, has three code arms 61, 62 and 63 pivotally connected at one end to plate 60 as indicated at 64 (FIG. 2). The pivotal movement of each code arm is limited by a guide bar 65, connected to the code plate, which has studs 65a extending therefrom. Each arm, at the end opposite its pivotal connection, has a pin 66 extending therethrough. The pins 66, acting in cooperation with a plurality of recesses 67 in the code plate 60 (five recesses for each pin) act as detents for the code arms. The pins 66, when set in a particular angular position, define a code corresponding to a desired destination for the carrier. The particular unloading station 13 for which the carrier is coded has limit switches (not shown) vertically positioned to correspond to the code position of the pins 66 on the carrier code arms and are operated thereby. The vertical positions of the limit switches at the unloading stations are all different and, consequently, the code arms on a particular carrier can be adjusted, or coded, to correspond to the vertical positions of the limit switches at one, and only one, of the unloading stations. Mechanism at the unloading station 13 for which a particular carrier is coded automatically unloads the tote box from that carrier in response to operation of all the limit switches at the unloading station.

Each loading station 12 has a code mechanism, indicated generally at 74 (FIG. 3), to angularly adjust the code arms of a carrier loaded at the station to the proper angular position corresponding to the desired destination. The station code mechanism comprises a plate 75 having three fixed ramps thereon 76, 77 and 78. These ramps are engaged by the pins 66 on the code arms of a carrier which is to be coded by the code mechanism 74. The ramps act to swing all of the code arms clockwise to their uppermost angular position. Immediately downstream of the fixed ramps on code plate 75, are three adjustable ramps 79, 80, 81 which are pivotable around one end as indicated at 82. The adjustable ramps are set by an attendant at the station by means of dials 83 which are connected to cams (not shown) in engagement with the movable ramps. When the dial is turned to a position corresponding to a desired code number, the cam moves the movable ramp to an angular position corresponding to that desired code number. Thus, when a carrier moves past the code mechanism 74, the pin 66 at the end of each code arm, which has been elevated by the fixed ramp 76, 77 or 78, is then lowered by the ramp (79, 80 or 81) to a position corresponding to the position of that ramp. Thus the position of the code arm corresponds to a particular code number.

The attendant at each load station codes only those carriers which are loaded at his station. Since there are more than one loading station, it is necessary that the code mechanism at the load station be disabled when carriers from other load stations pass by so that the code mechanism of one load station will not insert a new code number on carriers from the other load stations. According to the present invention, the code plate 75 is pivotally connected to the frame at the loading station and is shifted by linkage extending from the loader. The frame F, as shown in FIGURE 4, has two rearwardly extending spaced bars F1 and F2. The plate 75 is pivotally mounted at its lower edge on pivot pins 89 which extend from bars F1 and F2. An arm 90 is fixed to the code plate 75 and extends rearwardly therefrom. A spring 91 extends between the arm 90 and the frame bar F2 to urge the plate 75 into a forward vertical, or effective code writing, position.

Linkage mechanism (FIG. 2), indicated generally at 92, extends between the coding mechanism 74 and the loader 35. The linkage mechanism includes a rod 93 which depends from the end of the arm 90 and which is connected at the opposite end to a lever bar 94. The lever 94 is pivotally connected at 95 to the loader housing 45. A depending plunger 96 on the platform 47 engages the lever bar 94 when the platform descends to actuate the linkage mechanism. Actuation of the linkage mechanism tilts the arm 90, thereby tilting the plate 75 to a retracted position, or a position in which it is ineffective to code passing carriers.

In a conveyor system of the type in which the mechanism of the present invention is particularly useful, the loader operates automatically, after the station attendant has indicated articles are ready for loading. The platform of the loader rises when an empty carrier approaches, places the articles on the moving carrier as it passes, and descends. A schematic diagram of the pneumatic mechanism to operate the loader is shown in FIGURE 5. A solenoid operated valve V1 has a movable plunger 100 therein. The valve has a pressure port connected to pressure line 101, two discharge ports connected, respectively, to discharge lines 102 and 103 and vented to atmosphere, and two motor ports connected, respectively, to motor lines 104 and 105. The discharge lines 102 and 103 have adjustable restrictions 106 and 107, respectively, therein. The movable valve plunger 100 is connected to solenoid 1SOL and is shifted to the right as viewed in FIGURE 5 when the solenoid is energized. When the solenoid is deenergized the valve member 100 is shifted to the left by spring 108.

An electrical circuit for operation of the loader in the loading station is shown schematically in FIGURE 6. In FIGURE 6, relay contacts are numbered to correspond to the number of the relay by which they are operated, and bear, in addition, a suffix to distinguish between contacts. Normally open relay contacts are indicated by two parallel lines; normally closed relay contacts are indicated by two parallel lines with a diagonal line therethrough. Normally open limit switch contacts are indicated by a switch arm connected to one contact and spaced from the other contact; normally closed limit switch contacts are indicated by a switch arm connected to one contact and engaged with the other contact. Two lines L1 and L2 are connected across a source of energy E. Control relay 1CR is connected across lines L1 and L2 in series with normally open limit switch contacts 1LS1, normally open relay contacts 4CR2, and normally closed limit switch contacts 3LS2. Normally open contacts 1CR1 are connected across the limit switch contact 1LS1. A control relay 2CR is connected across lines L1 and L2 in series with normally open limit switch contacts 2LS1, normally open relay contacts 4CR3, normally closed relay contacts 1CR2, and normally closed relay contacts 3CR1. Normally open relay contacts 2CR1 are connected across limit switch contacts 2LS1. Solenoid 1SOL is connected across lines L1 and L2 in series with normally open relay contacts 2CR2. Control relay 3CR is connected across lines L1 and L2 in series with normally open limit switch contacts 3LS1 and normally open relay contacts 2CR3. Control relay 4CR is connected across lines L1 and L2 in series with push-button switch PB1 and normally closed relay contacts 3CR2. Normally open relay contacts 4CR1 are connected across push-button switch PB1.

Before a tote box is loaded at the loader station 12, the platform 47 is in its lowermost position (shown in dotted lines in FIGURES 2 and 3) below the level of the rollers on the loading conveyor 36 and between the rails 37a, 37b. The plunger 96, at this time, is engaged with the lever arm 94, holding the lever arm in its lowermost position. Thus, the coding mechanism is held in the retracted position by the linkage 92 at this time. Although the carriers which pass the station at this time operate limit switches LS2 and LS3 and tote boxes on the carriers operate limit switch 1LS, the loader is not actuated because the ready switch PB1 has not yet been pressed.

When a tote box on the load conveyor is ready for loading onto a carrier, the tote box is pushed over the platform 47 by the station attendant; and the code number of the desired destination of the tote box is dialed into the dials 83 on board 75. At this time, the push-button switch PB1 is pushed to energize control relay 4CR, which is sealed in around push-button switch PB1. When a full carrier comes along, after relay 4CR has been energized, the tote box on the carrier will operate limit switch 1LS, and relay 1CR will be energized. The relay 1CR will be sealed in around the limit switch contacts 1LS1. When that same carrier operates limit switch 2LS and 3LS neither relay 2CR nor 3CR will be energized because the normally closed contacts of relay 1CR are open when relay 1CR is energized. When that same carrier operates limit switch 3LS, relay 1CR is deenergized because the normally closed limit switch contacts 3LS2 open. Limit switch 3LS is operated by a carrier before the next carrier reaches the location of limit switch 1LS. When, eventually, an empty carrier reaches limit switch 1LS, that limit switch will not be operated. Thus, when that empty carrier reaches limit switch 2LS, relay 2CR will be energized and sealed in around the contacts 2LS1 of the limit switch. This will energize solenoid 1SOL, shifting valve member 100 to the right, and introducing air under pressure into motor line 104 and pneumatic cylinder 48 under the piston 49 therein. Air above the piston 49 is exhausted through line 105, valve V1, and discharge line 103. The rate of ascent of platform 47 is determined by the adjustment of the restriction 107. The platform 47 rises to its uppermost position where the bottom of the tote box thereon is above the level of the inturned flanges on stringers 30 of the empty carrier, which at this time, has not yet reached the station. As the platform 47 rose, lever arm 94 was released by plunger 96 and the plate 75, on which the station coding mechanism is mounted, swung up to a vertical position by virtue of spring 91, to shift the coding mechanism into an operating, or effective coding, position.

When the carrier reaches the station and envelops the tote box T, the limit switch 3LS is operated, energizing relay 3CR. Energization of relay 3CR releases relay 2CR and solenoid 1SOL. At the same time, relay 4CR is released. The spring 108 of valve V1 shifts the plunger 100 thereof to the left directing the air under pressure through motor line 105 to cylinder 48 above the piston 49. Air below the piston is evacuated through motor line 104, valve V1 and discharge line 102. The rate of descent of the platform 47 is determined by the adjustment of adjustable restriction 106.

As the platform 47 descends, the tote box is lifted off the platform by the carrier which continues its movement along the path defined by the endless track. As the carrier passes the station coding mechanism, the code arms on the carrier are set in accordance with the destination number dialed into the coding mechanism by the station attendant. After the carrier has passed the coding mechanism, the platform 47 reaches its lowermost position, where the plunger 96 depresses lever arm 94. This shifts the coding mechanism to a retracted, or ineffective, position so that subsequent carriers from other loading stations are not coded by the coding mechanism of this station.

Although the best mode contemplated for carrying out the present invention has been herein shown and described, it will be apparent that modification and variation may be made without departing from what is regarded to be the subject matter of the invention as set forth in the appended claims.

I claim:
1. In a conveyor system, the combination comprising:
 (a) a plurality of carriers movable along a path,
 (b) a loading station adjacent said path having a loader and having a coding mechanism operable to code the carriers for a particular destination, and
 (c) means operable in response to operation of the loader to control the operability of the coding mechanism.

2. In a conveyor system having a plurality of carriers movable along a path and having a loader to load articles on a carrier, the system having mechanism to code a passing carrier, the combination comprising a plate pivotally mounted on the downstream side of the loader to carry the code mechanism, said plate tiltable between a position toward the path of the carriers for coding and a position away from the path of the carriers, and a linkage between the plate and the loader to tilt the plate in response to operation of the loader.

3. In a conveyor system, the combination comprising:
 (a) a plurality of carriers movable in a predetermined directional sense along a path,
 (b) a loading station adjacent said path having a loader and having a coding mechanism on the downstream side of the loader to code carriers loaded by the loader, and
 (c) mechanical linkage extending between the loader and the coding mechanism to render the coding mechanism operable when the loader is operated and to render the coding mechanism inoperable when the loader is not operated.

4. In a conveyor system, the combination comprising:
 (a) a plurality of carriers movable in a predetermined directional sense along a path,
 (b) a loading station adjacent said path, said loading station having
   (1) a movable member operable to advance from a retracted position to transfer articles onto a carrier, and
   (2) coding mechanism mounted on the downstream side of said movable member, said coding mechanism shiftable between an effective position position for coding a carrier and an ineffective position, and
 (c) mechanical linkage extending between the coding mechanism and said movable member to hold the coding mechanism in the ineffective position when the movable member is retracted.

5. In a conveyor system, the combination comprising:
 (a) a plurality of conveyors movable in a predetermined directional sense along a path in spaced relationship,
 (b) a loading station adjacent said path, said loading station having
   (1) a platform operable on advance from a retracted position to transfer a load onto a movable carrier, and (2) coding mechanism mounted on the downstream side of said platform, said coding mechanism normally held in an effective position for coding a moving carrier, said coding mechanism shiftable to an ineffective position, and
(c) a mechanical linkage extending between the coding mechanism and said platform, said linkage engaged by the platform when the platform is retracted to hold the coding mechanism in the ineffective position.

References Cited

UNITED STATES PATENTS 3,303,916  2/1967  Burt _____ 198—38

RICHARD E. AEGERTER, *Primary Examiner.*